(12) United States Patent
Ishikawa et al.

(10) Patent No.: US 9,651,663 B2
(45) Date of Patent: May 16, 2017

(54) DISTANCE MEASUREMENT APPARATUS

(71) Applicant: TOSHIBA TEC KABUSHIKI KAISHA, Shinagawa-ku, Tokyo (JP)

(72) Inventors: Daisuke Ishikawa, Shizuoka (JP); Kenichi Komiya, Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/151,586

(22) Filed: May 11, 2016

(65) Prior Publication Data

US 2016/0363667 A1 Dec. 15, 2016

(30) Foreign Application Priority Data

Jun. 11, 2015 (JP) .................................. 2015-118454

(51) Int. Cl.
| | |
|---|---|
| *G01B 11/14* | (2006.01) |
| *G01S 17/32* | (2006.01) |
| *G01S 17/10* | (2006.01) |
| *G01S 17/42* | (2006.01) |
| *G01S 7/481* | (2006.01) |
| *G01S 7/486* | (2006.01) |
| *G01S 7/48* | (2006.01) |
| *G01S 7/491* | (2006.01) |

(52) U.S. Cl.
CPC .............. *G01S 17/32* (2013.01); *G01S 7/486* (2013.01); *G01S 7/4808* (2013.01); *G01S 7/4812* (2013.01); *G01S 7/4817* (2013.01); *G01S 17/105* (2013.01); *G01S 17/42* (2013.01); *G01S 7/4916* (2013.01)

(58) Field of Classification Search
CPC .............................. G01S 17/32; G01S 17/4808
USPC ............................................................ 356/614
See application file for complete search history.

(56) References Cited

U.S. PATENT DOCUMENTS

| | | | | |
|---|---|---|---|---|
| 2008/0186470 | A1* | 8/2008 | Hipp | G01S 7/481 356/5.08 |
| 2012/0069322 | A1* | 3/2012 | Kostamovaara | G01S 7/4865 356/5.01 |
| 2012/0176593 | A1* | 7/2012 | Frucht | G01S 7/4865 356/4.01 |
| 2013/0135420 | A1* | 5/2013 | Kawano | G02B 26/10 347/224 |
| 2014/0233012 | A1* | 8/2014 | Gusev | G01S 7/489 356/5.01 |
| 2016/0202214 | A1 | 7/2016 | Komiya et al. | |

(Continued)

*Primary Examiner* — Sunghee Y Gray
(74) *Attorney, Agent, or Firm* — Amin, Turocy & Watson LLP (57) ABSTRACT

A distance measurement apparatus comprises an acquisition section which counts time between a first timing when an output of a photodiode built in a semiconductor laser exceeds a first threshold value because a laser element of the semiconductor laser starts to output laser light and a second timing when the output of the photodiode exceeds a second threshold value higher than the first threshold value because the laser light is reflected by a measurement object and returns to the laser element, and acquires the counted time as flight time of the laser light from a moment when the laser light is output to a moment when the laser light is reflected by the measurement object and returns to calculate a distance from the laser element to the measurement object or displacement of the distance.

6 Claims, 5 Drawing Sheets

(56) References Cited

U.S. PATENT DOCUMENTS

2016/0202215 A1     7/2016   Ishikawa et al.
2016/0202216 A1     7/2016   Komiya et al.

* cited by examiner

DISTANCE MEASUREMENT APPARATUS

CROSS-REFERENCE TO RELATED APPLICATION

This application is based upon and claims the benefit of priority from Japanese Patent Application No. P2015-118454, filed Jun. 11, 2015, the entire contents of which are incorporated herein by reference.

FIELD

Embodiments described herein relate generally to a distance measurement technology with a fight time measurement method.

BACKGROUND

A distance measurement apparatus is known which can be used for measurement of the three-dimensional shape of a commodity or a component. In recent years, with the automation of production in a factory, a distance measurement apparatus which is small in size and cheap in cost is required to be capable of measuring at a high speed in a non-contact manner. Thus, a distance measurement apparatus (for example, see Japanese Unexamined Patent Application Publication No. Hei 6-213658) that measures a distance through a triangulation method using laser light and a distance measurement apparatus (for example, see Japanese Unexamined Patent Application Publication No. 2014-102072) that measures a distance through a fight time measurement method using laser light are developed.

Figure 1:
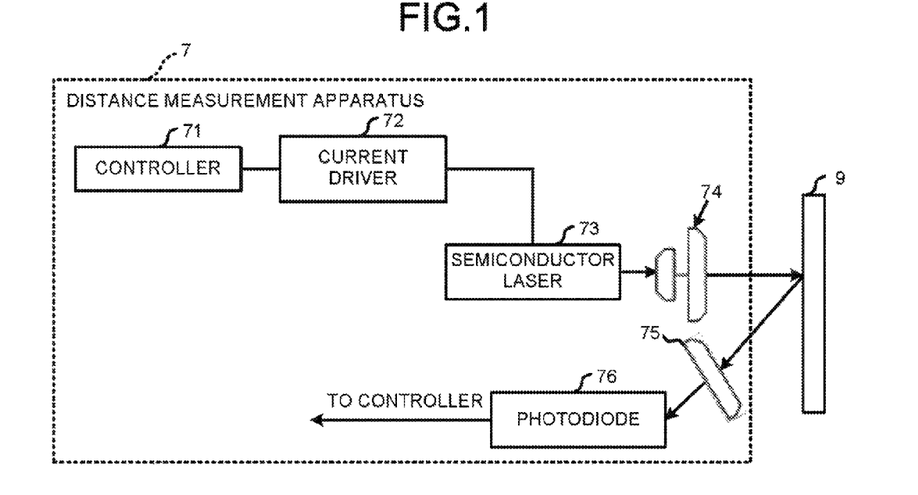
FIG. 1 is a diagram illustrating a distance measurement apparatus that measures a distance through a triangulation method.

FIG. 1 is a diagram illustrating a distance measurement apparatus 7 that measures a distance through the triangulation method.

In the distance measurement apparatus 7, a controller 71 controls to drive a semiconductor laser 73 via a current driver 72 at a constant current. A measurement object 9 is irradiated with laser light output by the semiconductor laser 73 via a condenser lens 74. The laser light reflected by the measurement object 9 makes a spot imaged on a photodiode 76 (position detection element) through a light receiving lens 75. The position of the spot changes depending on displacement amount of the laser light in an optical axis direction.

The controller 71, through a drive module (not shown), measures the displacement amount of the spot on the photodiode 76 while causing the distance measurement apparatus 7 and the measurement object 9 to move relatively in the vertical direction shown in FIG. 1 orthogonal to the optical axis of the laser light. In this way, the controller 71 can measure the displacement amount of the measurement object 9 in the optical axis direction to measure the surface shape of the measurement object 9.

However, there is a problem in the distance measurement apparatus 7 using the triangulation method that the range of a measurable distance to the measurement object 9 is extremely narrow.

Figure 2:
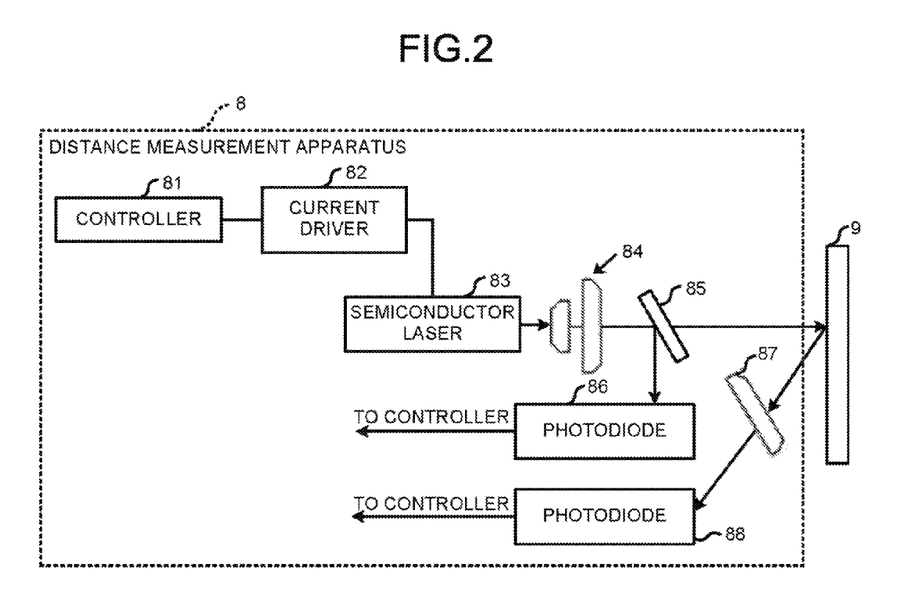
FIG. 2 is a diagram illustrating a distance measurement apparatus that measures a distance through a fight time measurement method.

FIG. 2 is a diagram illustrating a distance measurement apparatus 8 that measures a distance through the fight time measurement method.

In the distance measurement apparatus 8, a controller 81 controls to drive a semiconductor laser 83 at a constant current via a current driver 82. After laser light output by the semiconductor laser 83 is collimated by a collimating lens 84, part of the laser light is taken out by a half mirror 85 and the laser light of this part is received by a photodiode 86.

When the distance measurement apparatus 8 measures flight time of the laser light from a moment when the laser light is output to a moment when the laser light is reflected by the measurement object 9 and returns, the controller 81 starts to measure the flight time at a timing when the photodiode 86 receives the laser light.

The measurement object 9 is irradiated with the laser light passing through the half mirror 85. The laser light reflected by the measurement object 9 is received by the photodiode 88 through a light receiving lens 87. The controller 81 terminates the measurement of the flight time of the laser light at a timing when the photodiode 88 receives the laser light.

The controller 81 can measure the distance from the semiconductor laser 83 to the measurement object 9 by calculating the flight time of the laser light.

DETAILED DESCRIPTION

In accordance with an embodiment, a distance measurement apparatus comprises a semiconductor laser and an acquisition section. The semiconductor laser outputs laser light through a laser element and receives a back beam output by the laser element through a built-in photodiode. The acquisition section counts time between a first timing when an output of the photodiode exceeds a first threshold value because the laser element starts to output the laser light and a second timing when the output of the photodiode exceeds a second threshold value higher than the first threshold value because the laser light is reflected by the measurement object and returns to the laser element, and acquires the counted time as flight time of the laser light from a moment when the laser light is output to a moment when the laser light is reflected by the measurement object and returns to calculate a distance from the laser element to the measurement object or displacement of the distance.

Each embodiment is described below with reference to the accompanying drawings.

First Embodiment

Figure 3:
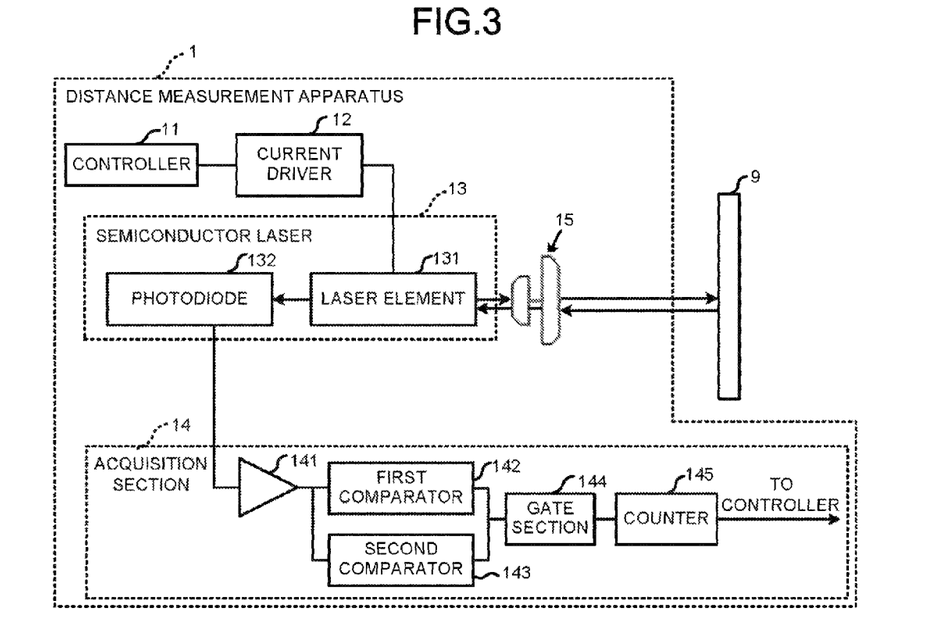
FIG. 3 is a diagram illustrating the structure of a distance measurement apparatus.

FIG. 3 is a diagram illustrating the structure of a distance measurement apparatus 1.

The distance measurement apparatus 1 calculates flight time of laser light from a moment when the laser light is output to a moment when the laser light is reflected by the measurement object 9 and returns to calculate a distance to the measurement object 9 or displacement of the distance.

A controller 11 of the distance measurement apparatus 1 is provided with a processor that controls various kinds of processing by reading programs in a memory (not shown), and controls the whole of the distance measurement apparatus 1. The controller 11 controls to drive a laser element 131 of a semiconductor laser 13 via a current driver 12 at a constant current. The controller 11 controls to drive the laser element 131 in such a manner that a constant output of the laser light is continued during the measurement of the flight time of the laser light.

The laser element 131, which is an edge-emitting laser diode, outputs laser light from one end surface. Further, the laser element 131 outputs a back beam from the other end surface opposite to one end surface in a direction opposite to the direction in which the laser light is output. The optical axis of the back beam and the optical axis of the laser light are on the identical straight line.

The back beam is received by the photodiode 132 built in the semiconductor laser 13. The photodiode 132 arranged to be adjacent to the laser element 131 is integrally packaged with the laser element 131.

Light emission efficiency of the laser element 131 reduces as the temperature becomes higher, and the output of the laser light changes according to the environment temperature. Herein, the intensity of the back beam is in proportion to the output of the laser light. Thus, by monitoring the back beam, it is known to carry out a feedback control that sets the output of the laser light to be constant.

In the present embodiment, the photodiode 132 for monitoring of back beam built in the semiconductor laser 13 is used, and the acquisition section 14 calculates the flight time of the laser light.

Specifically, the acquisition section 14 regards a timing when the photodiode 132 starts to receive the back beam as a timing when the laser light is output towards the measurement object 9, that is, a measurement start timing of the flight time of the laser light.

The measurement object 9 is irradiated with the laser light output by the laser element 131 via a collimating lens 15. The laser light reflected by the measurement object 9 enters into the laser element 131. The laser light entering into the laser element 131 resonates with the output laser light in the laser element 131 to increase the output of the back beam.

Thus, the acquisition section 14 regards a timing when the output of the photodiode 132 is increased through the increase of the output of the back beam as a timing when the laser light is reflected by the measurement object 9 and returns to the laser element 131, that is, a measurement end timing of the flight time of the laser light.

The acquisition section 14, on the basis of the output of the photodiode 132, acquires a difference between a timing when the laser element 131 starts to output the laser light and the timing when the laser light is reflected by the measurement object 9 and returns to the laser element 131 as the flight time of the laser light.

The acquisition section 14 counts the flight time of the laser light and outputs a signal indicating the flight time of the laser light to the controller 11.

Such an acquisition section 14 comprises a conversion circuit (not shown) that converts a current output by the photodiode 132 into a voltage, an amplifier 141 that amplifies the output of the photodiode 132 passing the conversion circuit, first and second comparators 142 and 143 into which the output of the photodiode 132 passing the amplifier 141 is input, and a gate section 144 and a counter 145 arranged at the latter part of the first and second comparators 142 and 143. The first and second comparators 142 and 143, the gate section 144, and the counter 145 are described later.

The controller 11, based on the flight time of the laser light, calculates a distance to the measurement object 9. Further, the controller 11 can calculate displacement of the distance to the measurement object 9 and can measure a surface shape of the measurement object 9 by causing the semiconductor laser 13 and the collimating lens 15, and the measurement object 9 to relatively move in a direction orthogonal to an optical axis of the laser light (in the vertical direction of the paper surface of FIG. 3).

Figure 4:
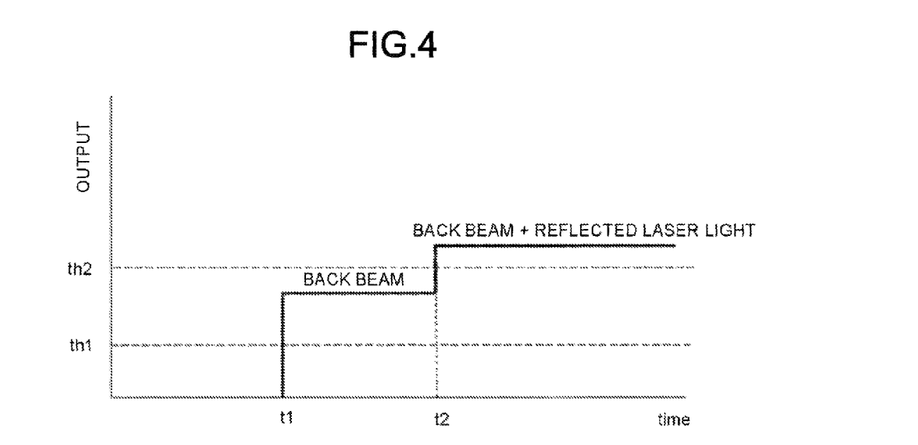
FIG. 4 is a diagram illustrating an output of a photodiode.

FIG. 4 is a diagram illustrating the output of the photodiode 132. In FIG. 4, horizontal axis represents time and vertical axis represents the output of the photodiode 13.

When the laser element 131 does not output the laser light, the output of the photodiode 132 is zero. In order to easily output the laser light, usually, a small amount of bias current is input to the laser element 131 to enable the laser element 131 to emit glimmer in some cases. In this case, the output of the photodiode 132 becomes a value corresponding to light receiving amount of a weak back beam until a timing t1 when the laser light for measurement is output.

At the timing t1 when the laser element 131 starts the output of the laser light, the output of the photodiode 132 is increased in correspondence with the light receiving amount of the back beam.

The output of the first comparator 142 is binary, and the output differs depending on whether or not the output of the photodiode 132 exceeds a threshold value th1 (a first threshold value). Specifically, an output voltage of the first comparator 142 becomes high in a case in which an output voltage of the photodiode 132 input to a first input terminal exceeds a reference voltage th1 as a threshold value input to a second input terminal, and the output voltage thereof becomes low in a case in which the output voltage of the photodiode 132 is smaller than the reference voltage th1.

In this way, in a case in which the output of the first comparator 142 is high, it can be determined that the laser element 131 starts the output of the laser light. Further, the threshold value th1 is set to a value lower than the output of the photodiode 132 at the timing t1. The threshold value th1 is set to a value higher than the output of the photodiode 132 at the time of the reception of the back beam caused by the bias current in a case of inputting the bias current to the laser element 131.

At a timing t2 when the laser light reflected by the measurement object 9 returns to the laser element 131 and enters into the laser element 131, the resonance in the laser element 131 occurs through the returned laser light, and the output of the back beam is increased. Thus, at the timing t2, the output of the photodiode 132 receiving the back beam is further increased.

The second comparator 143 has the same structure as the first comparator 142, but differs from the first comparator 142 only in a threshold value th2. The threshold value th2 is set to a value lower than the output of the photodiode 132 at the timing t2 and higher than the output of the photodiode 132 at the timing t1.

In this way, in a case in which the output of the second comparator 143 is high, it can be determined that the laser light reflected by the measurement object 9 returns to the laser element 131.

The intensity of the laser light reflected by the measurement object 9 and returning to the laser element 131 varies according to the distance from the distance measurement apparatus 1 to the measurement object 9 and the reflectance of the measurement object 9. Thus, the threshold value th2 and the threshold value th1 (reference voltages th1 and th2 of the comparators 142 and 143) for determining whether or not the laser light returns to the laser element 131 can be changed randomly by the controller 11.

Figure 5:
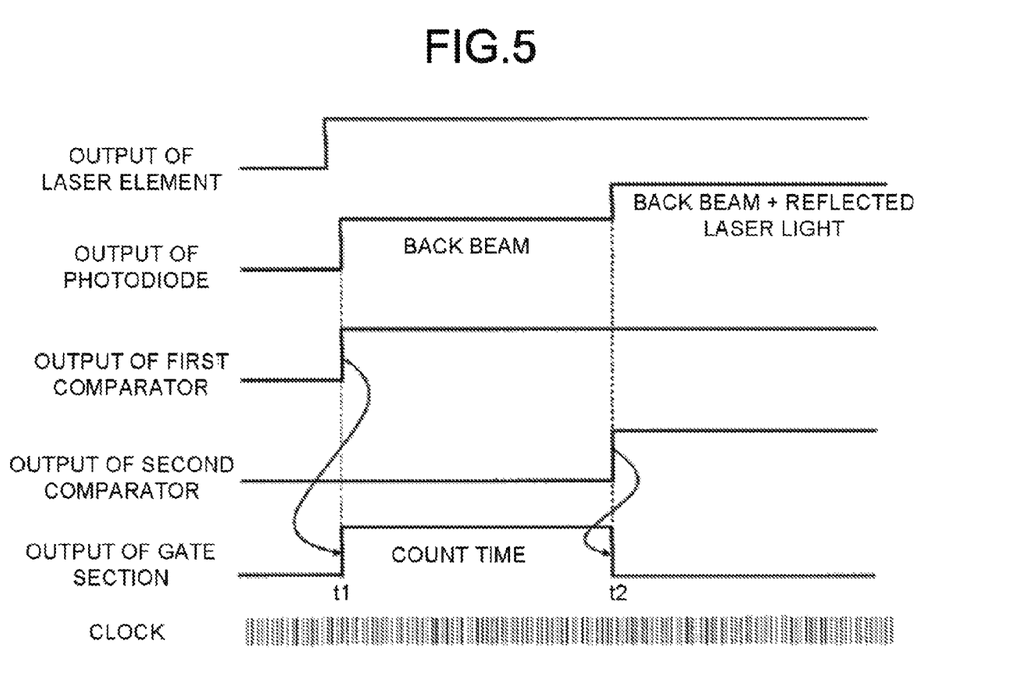
FIG. 5 is a timing chart illustrating operating principles of a gate section and a counter.

FIG. 5 is a timing chart illustrating operating principles of the gate section 144 and the counter 145.

In a case in which the output of the first comparator 142 is high and the output of the second comparator is low, an output of the gate section 144 is high, and in a case in which the combination of the output of the first comparator 142 and that of the second comparator 143 is other situations except the above, the output of the gate section 144 is low.

In other words, the output of the gate section 144 is high during a period from a moment when the laser light is output to a moment when the laser light is reflected by the measurement object 9 and returns.

The counter 145 counts time using a clock and calculates the flight time of the laser light when the output of the gate section 144 is high.

The controller 11, on the basis of the measured value of the counter 145, calculates the distance to the measurement object 9 or the displacement of the distance.

For example, the controller 11 calculates a distance L from the distance measurement apparatus 1 (the laser element 131) to the measurement object 9 according to the following formula (1). In the formula (1), the flight time of the laser light measured by the counter 145 is set to t, and the speed of the laser light is set to c.

$$L=(\tfrac{1}{2})*t*c \quad (1)$$

Figure 6:
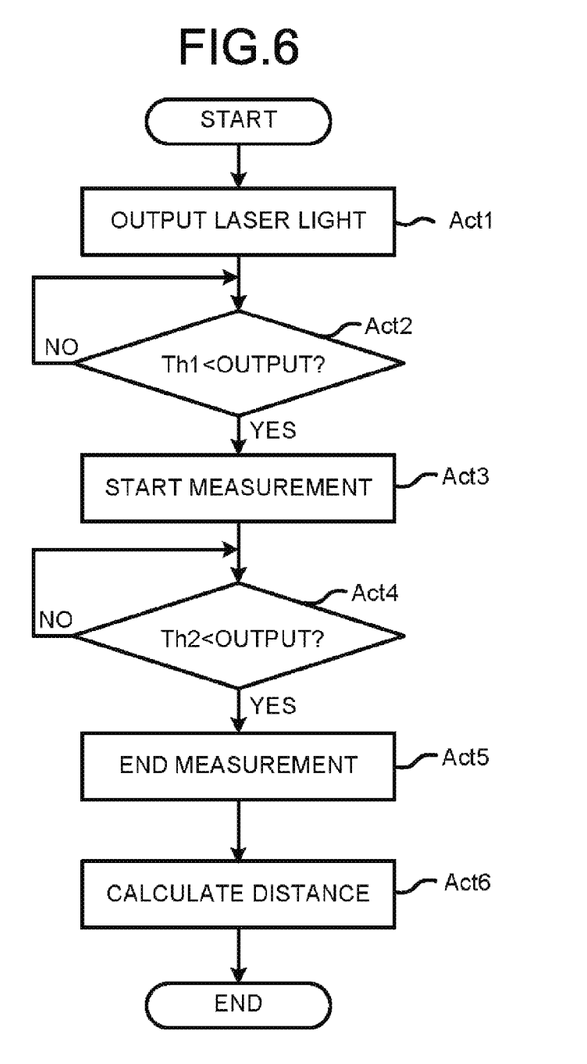
FIG. 6 is a flowchart illustrating a distance measurement processing.

A distance measurement processing carried out by the distance measurement apparatus 1 is simply described below with reference to a flowchart shown in FIG. 6.

The distance measurement apparatus 1 outputs laser light through the laser element 131 (Act 1).

As the laser element 131 also outputs a back beam when outputting the laser light, the photodiode 132 detects the back beam, and in this way, it can be determined that the laser element 131 is outputting the laser light.

Thus, the distance measurement apparatus 1 monitors whether or not the output of the photodiode 132 exceeds the threshold value th1 indicating the reception of the back beam (Act 2).

In a case in which the output of the photodiode 132 exceeds the threshold value th1 (YES in Act 2), the distance measurement apparatus 1 determines the timing t1 when the output of the photodiode 132 exceeds the threshold value th1 as a timing when the laser element 131 starts to output the laser light. The distance measurement apparatus 1 starts to measure the flight time of the laser light at the timing t1 (Act 3).

If the laser light is reflected by the measurement object 9 and returns to the laser element 131, the returned laser light resonates with the output laser light in the laser element 131, and the output of the back beam is increased. Thus, by detecting the increase of the output of the back beam through the photodiode 132, it can be determined that the laser light is reflected by the measurement object 9 and returns to the laser element 131.

Thus, the distance measurement apparatus 1 monitors whether or not the output of the photodiode 132 exceeds the threshold value th2 indicating that the laser light returns to the laser element 131 (Act 4).

In a case in which the output of the photodiode 132 exceeds the threshold value th2 (YES in Act 4), the distance measurement apparatus 1 determines the timing t2 as a timing when the laser light is reflected by the measurement object 9 and returns to the laser element 131. Then, the distance measurement apparatus 1 ends the measurement of the flight time of the laser light at the timing t2 (Act 5).

The distance measurement apparatus 1, on the basis of the flight time of the laser light, calculates a distance to the measurement object 9 or displacement of the distance (Act 6).

Second Embodiment

Figure 7:
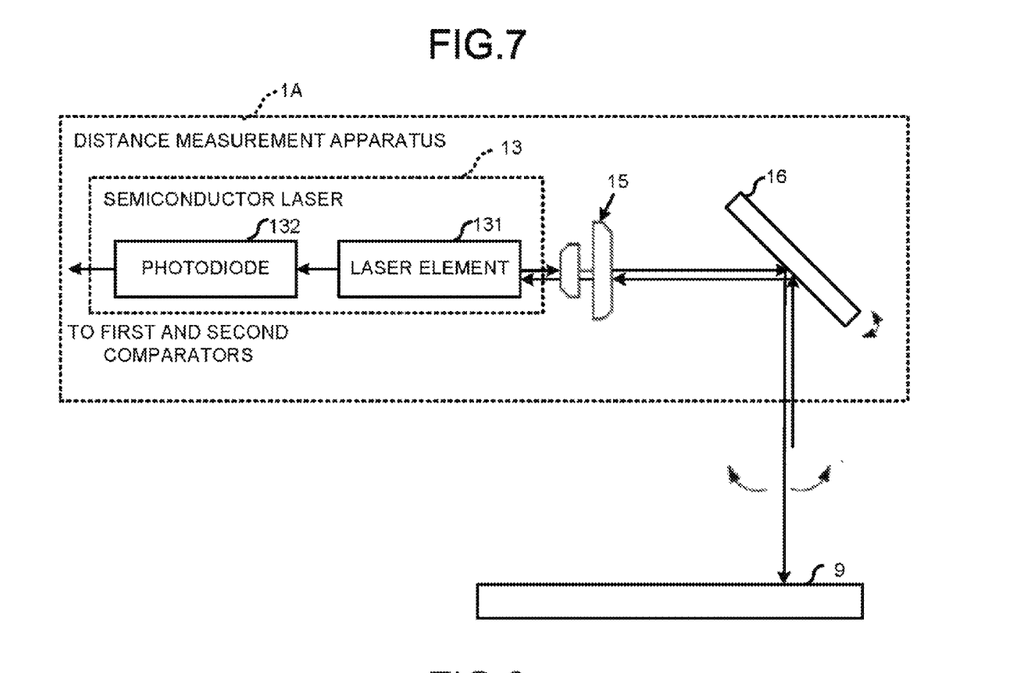
FIG. 7 is a diagram illustrating the structure of main portions of a distance measurement apparatus.

FIG. 7 is a diagram illustrating the structure of main portions of a distance measurement apparatus 1A.

The distance measurement apparatus 1A is provided with a galvanometer mirror 16, which is different from the distance measurement apparatus 1, other constitutions thereof are identical to those of the distance measurement apparatus 1.

The galvanometer mirror 16 is inclinable in any direction through a drive module (not shown), and can direct the laser light to any two-dimensional direction. In the present embodiment, an output direction of the laser light can be designated in a coordinate (X, Y), and the controller 11 controls an angle of the galvanometer mirror 16 so that a position of the coordinate (X, Y) is irradiated with the laser light.

Figure 8:
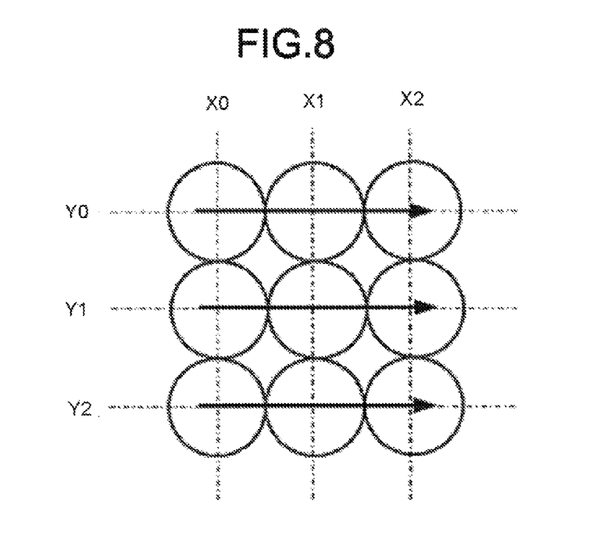
FIG. 8 is a diagram illustrating each measurement position of a measurement object.

FIG. 8 is a diagram illustrating each measurement position of a measurement object 9.

The controller 11 drives the galvanometer mirror 16 to scan the laser light in a horizontal scanning direction at a position of which the coordinate is Y0 in a vertical scanning direction.

The controller 11 first emits the laser light to a position (X0, Y0) (a first position) and measures flight time of the laser light to the position (X0, Y0). The controller 11, at this time, maintains an irradiation position of the laser light at the position (X0, Y0) until the measurement of the flight time of the laser light at the position (X0, Y0) is terminated.

Next, the controller 11 drives the galvanometer mirror 16 to cause the irradiation position of the laser light to move to a position (X1, Y0) obtained by shifting one coordinate in the horizontal scanning direction and measures flight time of the laser light to the position (X1,Y0) (a second position).

In this way, the controller 11 shifts the laser light every one coordinate in the horizontal scanning direction and scans the laser light in the horizontal scanning direction. Then, the controller 11 measures the flight time of the laser light at each coordinate position in the horizontal scanning direction.

If the measurement in the horizontal scanning direction is terminated, the controller 11 scans the laser light in the horizontal scanning direction at a position Y1 obtained by shifting one coordinate in the vertical scanning direction orthogonal to the horizontal scanning direction, and measures flight time of the laser light at coordinate positions (X1, Y1) (X2, Y1) . . . in the horizontal scanning direction.

The controller 11, on the basis of the flight time of the laser light of each coordinate position acquired in this way, calculates a distance to each coordinate position or displacement of the distance to the coordinate position, i.e., a surface shape of the measurement object 9.

A scan pattern of the laser light may be made into a zigzag shape as stated above in the X-Y plane, or a spiral shape as long as the shape is suitable.

Effect

In the first and second embodiments, the back beam is monitored by one photodiode 132, and the measurement start timing t1 and the measurement end timing t2 of the flight time of the laser light are obtained. Thus, in the first and second embodiments, compared with the conventional structure shown in FIG. 2 that uses the half mirror 85 and plural photodiodes 86 and 88, the device structure can be simplified and miniaturized.

In the first and second embodiments, as the photodiode 132 for monitoring built in the semiconductor laser 13 is used, a ready-made semiconductor laser 13 can be used and the distance measurement apparatuses 1 and 1A can be created easily.

What is claimed is:

1. A distance measurement apparatus, comprising:
a semiconductor laser comprising an edge-emitting laser diode that produces a constant first output of laser light through a first edge in a first direction and produces a constant second output of laser light through a second edge in a second direction opposite the first direction;
a photodiode adjacent to and coupled with the edge-emitting laser diode, the photodiode integrally packaged with the edge-emitting laser diode, and
an acquisition section comprising a conversion circuit for converting a current output by the photodiode into a voltage, an amplifier for amplifying the voltage, a first comparator and a second comparator into which the voltage is input, and a gate section and a counter coupled to an output of the first comparator and the second comparator, the acquisition section configured to count time between a first timing when output laser light through the first edge exceeds a first threshold value and a second timing when the output of the photodiode exceeds a second threshold value higher than the first threshold value when the laser light is reflected by the measurement object and returns to the laser element, and acquires the counted time as flight time of the laser light from a moment when the laser light is output to a moment when the laser light is reflected by the measurement object and returns to calculate a distance from the laser element to the measurement object or displacement of the distance.

2. The distance measurement apparatus according to claim 1, wherein
the first comparator of the acquisition section is configured to carry out a first different output according to whether or not the output of the photodiode exceeds the first threshold value;
the second comparator of the acquisition section is configured to carry out a second different output according to whether or not the output of the photodiode exceeds the second threshold value; and
a counter configured to count elapsed time between a first time when the output of the first comparator exceeds the first threshold value and a second time when the output of the second comparator exceeds the second threshold value as the flight time; and
the first threshold value and the second threshold value can be changed.

3. The distance measurement apparatus according to claim 1, wherein
the laser element continues the output of the laser light in the measurement of the flight time.

4. The distance measurement apparatus according to claim 2, wherein
the laser element continues the output of the laser light in the measurement of the flight time.

5. The distance measurement apparatus according to claim 1, further comprising
a mirror configured to reflect the laser light output by the laser element and change an output direction of the laser light; and
a controller configured to control an angle of the mirror and after scanning the laser light in a horizontal scanning direction, scan the laser light in the horizontal scanning direction at a position shifted in a vertical scanning direction.

6. The distance measurement apparatus according to claim 5, wherein
the controller maintains an irradiation position of the laser light at a first position of the measurement object until the measurement of the flight time is terminated at the first position, and cause the irradiation position of the laser light to move to a second position shifted from the first position of the measurement object in the horizontal scanning direction if the measurement of the flight time at the first position is terminated.

* * * * *